United States Patent [19]

Johnson et al.

[11] Patent Number: 5,218,038
[45] Date of Patent: Jun. 8, 1993

[54] PHENOLIC RESIN COATED PROPPANTS WITH REDUCED HYDRAULIC FLUID INTERACTION

[75] Inventors: Calvin R. Johnson, Dockport; Kwok-tuen Tse, Berwyn, both of Ill. Charles J. Korpics, Okland Park, IL.

[73] Assignee: Borden, Inc., Columbus, Ohio

[21] Appl. No.: 792,004

[22] Filed: Nov. 14, 1991

[51] Int. Cl.$^5$ ................ C08L 61/00; C08L 61/10; C08L 61/14; C08G 8/00

[52] U.S. Cl. ................ 524/541; 525/390; 525/398; 525/402; 528/155

[58] Field of Search ........... 524/541; 528/155; 525/390, 398, 402

[56]  References Cited

U.S. PATENT DOCUMENTS

| | | | |
|---|---|---|---|
| 2,675,335 | 4/1954 | Rankin et al. | 428/529 |
| 4,179,429 | 12/1979 | Hanauye et al. | 260/328 R |
| 4,250,076 | 2/1981 | Golden et al. | 524/541 |
| 4,317,896 | 3/1982 | Holik | 525/501 |
| 4,426,484 | 1/1984 | Saeki et al. | 524/541 |
| 4,873,145 | 10/1989 | Okada et al. | 428/407 |
| 4,888,240 | 12/1989 | Graham et al. | 428/403 |
| 4,969,522 | 11/1990 | Whitehurst et al. | 166/278 |

*Primary Examiner*—Paul R. Michl
*Assistant Examiner*—LaVonda DeWitt
*Attorney, Agent, or Firm*—Dennis H. Rainear; Kenneth F. Van Wyck

[57] ABSTRACT

The invention relates to the modification of a curable phenolic resin system by the incorporation of alkylphenol, alkoxyphenol, arylphenol or aryloxyphenol. The resulting resin has reduced water soluble leachates which, in turn, improves the break time when the resin is used to coat proppants for treating subterranean formations.

25 Claims, No Drawings

PHENOLIC RESIN COATED PROPPANTS WITH REDUCED HYDRAULIC FLUID INTERACTION

BACKGROUND OF THE INVENTION

1. Field of the Invention

This invention is directed to the use of coated free flowing sand comprising a curable phenolic resin system, useful as a subterranean proppant. The improved resin system of this invention is a phenol-formaldehyde resin which may contain alkoxyl or aroxylphenol, alkylphenol or arylphenol and is not cured by hexamethylenetetramine. The invention also relates to the use of a mixture of resole and novolak resins without alkylation, arylation or other modifiers to coat sand particles.

2. Description of Related Art

The use of resin-coated proppants or propping agents is increasingly important in treating subterranean formations. One of the primary uses of curable resin-coated sand is to minimize or prevent proppant flowback from a fracture during cleanup or production in oil and gas wells. Resin-coated curable proppants are also useful in sand control. In hydraulic fracturing, coated particles are used to maintain the fracture in a propped condition, and to improve the stability of proppants at high closure stresses. Sand or other substrates have been coated with resins such as an epoxy, furan, or phenolic resin. However, these systems, especially partially cured and curable resin-coated proppants, can hinder the interaction of the breaker with fracturing hydraulic fluids, causing delay in fluid breaking and resulting in various production difficulties. It has also been determined that hexamethylenetetramine, which is often used to initiate the cure of phenolic resins, can be the cause of the delays in fracturing fluid breaking. The production difficulties can include, for example, the cross-linked gel not reducing in viscosity a required so the fluid can flow back out, thus delaying production from the well. Furthermore, if the fracturing fluid gel does not break and allow the curable resin-coated proppants to come together before the resin cures, they cannot bond together forming a three dimensional matrix. If they do not bond together, flowback may occur. It is also desirable to have the gel which is formed break at some designated time to reduce viscosity and allow water and ultimately gas or oil to flow out of the well. Also contributing to these problems are water soluble components, such as unreacted phenol or low molecular weight resin components, often present in the phenolic resins.

The most widespread fracturing treatment to achieve proppant consolidation is the use of curable phenolic resins pre-coated on the proppant. Generally, such coated materials are manufactured away from the well site and delivered to the well location. Another approach is to coat the proppant on-site by adding required resin materials to the fluid so that coating occurs while the proppant is being pumped or even after the sand is pumped downhole.

Rankin, et al., U.S. Pat. No. 2,675,335 issued Apr. 13, 1954, relates to thermosetting phenol-formaldehyde compositions useful for the manufacture of laminated articles with desirable electrical properties. Rankin et al. teaches the addition to the composition of minor amounts of monobutyl phenol and dibutyl phenol. Rankin et al. teaches that the resulting laminating resins have better water resistance, retention of electrical properties, and improved flow characteristics enhancing the penetration of the resin into paper and fabric. Use of the claimed materials as a subterranean proppant is not suggested in Rankin et al., and hexamethylenetetramine is used as a catalyst.

Hanauye et al., U.S. Pat. No. 4,179,429 issued Dec. 18, 1979, relates to a phenol resin useful as a varnish for impregnating a base to thereby obtain superior mechanical and electrical characteristics. Phenol resins containing as the phenol component thereof nonylphenol are identified for improving punching quality in electrical laminates. Subterranean proppants are not suggested.

Holik, U.S. Pat. No. 4,317,896 issued Mar. 2, 1982, teaches a binder for foundry aggregate comprising a butylated phenol formaldehyde resin, plus a resole resin, plus a novolak resin. Holik is not directed to subterranean proppants and provides a resin which is cured with a diisocyanate and a tertiary amine.

Saeki, et al., U.S. Pat. No. 4,426,484 issued Jan. 17, 1984, teaches acceleration of the cure of a resole-type phenol aldehyde resin by the addition of resorcinol. The resin comprises a mixture of resole-type and novolak-type resins.

Okada et al., U.S. Pat. No. 4,873,145 issued Oct. 10, 1989, teaches a water resistant resin-coated aggregate for use in concrete with a novolak resin. However, Okada et al. cures the resin by use of hexamethylenetetramine, and does not suggest subterranean proppant applications.

Graham, et al., U.S. Pat. No. 4,888,240 issued Dec. 19, 1989, teaches an improved resin for use as a proppant in hydraulic fracturing of subterranean formations. Alkylphenol modification of the resin is not discussed and Graham et al. uses hexamethylenetetramine as both a catalyst and a source of formaldehyde.

Whitehurst, et al., U.S. Pat. No. 4,969,522 issued Nov. 13, 1990, teaches the preparation of a polymer-coated support in subterranean oil well formations. However, the polymers of Whitehurst, et al. are olefins cured by traditional Ziegler catalysis. Alkylphenol modified phenol-formaldehyde resins are not suggested.

The applicants and others have utilized mixtures of resole resin and novolak resin curable with hexamethylenetetramine in subterranean formations, where said resins are not arylphenol- or alkylphenol-modified.

Therefore, it is desirable to have a proppant for subterranean use which will have reduced interactions between the breaker and hydraulic fluid relative to those of curable proppants currently available. Thus, it is an object of the present invention to provide a resin useful as a coating for proppants, whereby the resin coating does not utilize hexamethylenetetramine in a quantity sufficient to effect the cure. It is another object of the present invention to reduce the water solubility of the phenolic resin on the coated sand, or leachate therefrom, to thereby minimize the deleterious interaction between the breaker and the hydraulic fluids.

SUMMARY OF THE INVENTION

The present invention provides an improved resin-coated proppant comprising a particulate substrate and a phenolic resin coating composition which is not cured by means of hexamethylenetetramine. The phenolic coating composition of the present invention can comprise a mixture of novolak and resole resins. The phenolic resin coating composition of the present invention is further improved by the addition of one or more alkylphenols, arylphenols, alkoxyphenols or aryloxyphenols in amounts sufficient to reduce the water solubility of the resulting phenolic resin coating. The alkyl or aryl group or groups on the alkylphenol or arylphenol used to modify the resin can include, for example, phenyl, methyl, ethyl, propyl, isopropyl, n-butyl, t-butyl, isobutyl, n-pentyl, isopentyl, isoamyl, n-hexyl, branched hexyls, n-heptyl, branched heptyls, n-octyl, branched octyls, n-nonyl, branched nonyls, n-decyl, branched decyls, undecyl, and dodecyl. Mixtures of these and higher alkylphenols, such as, for example, cashew nut shell liquid, are also operative herein. By "aryl" herein is meant phenyl and substituted phenyl groups including alkaryls and arylalkyls.

It has been discovered that the modification with one or more alkylphenols of a phenolic resin system used to coat proppants provides reduced water solubility of the resin coating system. As the degree of substitution on the phenol ring increases, the water solubility of the phenol resin, and its leachate decreases. Reduced water solubility of these systems is highly desirable because water soluble resin and components thereof can interfere with the performance of the proppant and/or the hydraulic fluid in subterranean applications.

According to the present invention, the phenolic resin may be modified by incorporating one or more alkyl, aryl, alkoxy or aryloxy groups on the phenol ring structure, wherein multiple substituent groups may, but need not be different. Thus, for example, the phenol used to prepare the resole resin or the novolak resin could be dialkylated wherein one group is methyl or ethyl and the second group is aryl, nonyl or decyl. It is preferred but not required that the alkyl or aryl group or groups be in positions ortho or para to the phenolic hydroxy group. However, to achieve the desired crosslinking, two or more active crosslink sites must remain on the phenol ring. The selections of the modifying substituent group or groups for the preparation of the resole resin and the novolak resin may be independent of each other. Thus, for example, the resole resin can be monoalkylated or dialkylated with relatively short chain alkyl groups, while the novolak resin can be mono or dialkylated with long chain alkyl groups. There is no limitation as to the number of alkyl or aryl groups, or the length of the alkyl chains, or the combination of groups in the modification of the phenolic resin, provided (1) crosslinking is still achieved in the subterranean formation and (2) water solubility is decreased.

The present invention also provides an improved method for treating subterranean formations, such as natural gas and oil wells, said method comprising the steps:

(a) applying to a subterranean formation a proppant coated with a curable phenolic coating composition, wherein the phenolic coating composition comprises a mixture of a novolak resin and a resole resin, wherein at least one of the resins may optionally be alkylphenol-modified, alkoxy-modified, aryloxy-modified, or arylphenol-modified, whereby the spectrophotometric absorbance at 510 millimicrons of the water soluble leachate from the phenolic resin coated sand composition is below about 1.68, and wherein the phenolic coating composition does not comprise hexamethylenetetramine in an amount to significantly affect the cure of the coating;

(b) curing the curable phenolic coating compositions without hexamethylenetetramine by exposing the coating composition to sufficient heat and pressure in the subterranean formation to cause crosslinking of the resins and consolidation of the proppant.

The present invention also provides a method of using the modified phenolic resins of the present invention.

In one embodiment, the resin of the present invention, which is useful for coating a particulate substrate, is preferably a combination of an alkylphenol-modified novolak resin and an alkylphenol-modified resole resin. The resole resin may be prepared from 100% alkylphenol. It is preferred in this invention that the mole ratio of alkylphenol to phenol in the resole resin be greater than 0.05:1 and preferably be from about 0.10:1 to about 1:1. While the novolak resin need not be modified, it is preferred in this invention that the mole ratio of alkylphenol to phenol in the novolak resin be greater than 0.05:1 and preferably be from about 0.10:1 to about 0.60:1. The resole resin is useful herein to initiate the cure of the novolak resin. Therefore, a preferred amount of resole resin is an amount equal to or greater than the amount needed to initiate cure or crosslink of the novolak resin. It is preferred that the weight ratio of novolak resin to resole resin in the coating composition be from about 4:1 to 1:9 on solids basis. Preferred alkylphenols useful for modification of the novolak resin or the resole resin or both are nonylphenol and dodecylphenol.

DETAILED DESCRIPTION OF THE INVENTION

In one embodiment of the present invention a phenolic resin composition is prepared which comprises a novolak resin, such as for example, but not limited to EX5150 flake resin or Acme Plastiflake 1181 resin, or OX-31 novolak resin available from Borden Packaging and Industrial Products, a division of Borden, Inc., in Louisville, Ky. The resin components are combined with particulate substrate, such as, for example, sand, and also optionally a silane coupling agent.

In a preferred embodiment, the particulate substrate is sand and the silane coupling agent is A-1100, available from Union Carbide Corporation of Tarrytown, N.Y. Other organofunctional silane coupling agents, such as Z-6011, available from Dow Corning Corporation of Midland, Mich., are also useful herein to enhance the coupling between the phenolic resin composition and the surface of the particulate substrate.

It is preferred in the present invention that the novolak resin comprise a modified novolak resin which may be prepared by reacting formaldehyde and phenol with an arylphenol or an alkylphenol, such as nonylphenol or other modified phenols. The novolak resin may optionally be further modified by the addition of Vinsol®, or epoxy resins, or bisphenol A, or waxes, or other known resin additives. The preferred mode of preparation of an alkylphenol-modified novolak resin, such as nonylphenol-modified novolak resin, is to combine nonylphenol and phenol at a molar ratio above 0.05:1 and preferably between 0.10:1 and 0.60:1. This combination is reacted with a source of formaldehyde under acidic catalysis, or divalent metal catalysis (e.g., Zn, Mn), wherein the combination of nonylphenol and phenol is present in greater than equimolar amount relative to the formaldehyde present. The preferred phenol or modified phenol to formaldehyde molar ratio is 1:0.85 to 1:0.5. Under such conditions, the polymerization of the methylol phenols is a much faster reaction than the initial methylolation from the formaldehyde. Consequently, a polymer structure is built up consisting of phenolic and nonylphenolic nuclei, linked together by methylene bridges, and with essentially no free methylol groups.

The preferred mode of preparation of an alkylphenol-modified resole resin is to combine alkylphenol and phenol at a molar ratio above 0.05:1 and preferably between about 0.10:1 and about 0.60:1 and as high as 1:0. In a preferred mode, the phenol used in the preparation of the resole resin comprises phenol and/or an alkylphenol. Preferred alkylphenols are nonylphenol and dodecylphenol. This combination is reacted with a source of formaldehyde such as formalin or paraformaldehyde or formaldehyde itself under alkaline catalysis, wherein the formaldehyde is present in molar excess. It is preferred in the present invention that the resole resin have a molar ratio of formaldehyde to phenol which is above 1.25:1 and preferably is from about 1.5:1 to 3:1. A more preferred molar ratio of formaldehyde to phenol in the preparation of the resole useful herein is about 2.0:1 to 2.75:1. The preferred alkaline catalyst is lime, $Ca(OH)_2$. In this manner is produced, for example, a nonylphenol-modified resole resin. It is desirable that the resin coated sand made from modified resole resin have leachate with spectrophotometric absorbance at 510 mu below about 1.68 and preferably below about 0.60 to about 1.0.

It is not required in the practice of the present invention that either or both the novolak and the resole resins be arylphenol, alkoxyphenol, aryloxyphenol, or alkylphenol-modified. In a preferred embodiment, at least one of the resins is so modified to achieve in the resulting coating composition the desired reduction in water soluble leachate and improvement in reduced interaction between the breaker and the hydraulic fluids. Thus, commercial non-modified novolak resins can be used in the present invention.

In another embodiment, neither the resole nor the novolak is alkyl-, alkoxy-, aryloxy-, or aryl-modified yet the combination provides a cured material with reduced water solubility. Such a combination of non-modified resole and non-modified novolak resins can be used in the absence of hexamethylenetetramine in the present invention for subterranean formations provided the resin mixture is advanced sufficiently to impart reduced water solubility. The advancing of the resin or resin mixture can be achieved, for example, by holding the resin or the resin-coated sand at an elevated temperature for a time sufficient to allow the cure reaction to continue, thereby increasing the molecular weight of the resin. With the increase in molecular weight, the resin's water solubility is reduced.

The free phenol content of non-modified novolak can be reduced by applying the novolak resin to hot sand (e.g., 250° F.) and/or by mixing the novolak resin with hot sand for a longer mix time than is conventional. By these means, free phenol is evaporated from the novolak resin. Other novolak resins are also suitable in the present invention with or without alkylphenol, arylphenol, alkoxyphenol or aroxyphenol modification of the resole resin, if the water solubility of the resole/novolak resin-coated composition is sufficiently lowered to increase the hydrophobic nature of the phenolic resin compositions during the coating process.

In a similar manner, if non-modified resole resins are used in the present invention, it is preferred, though not required, that the novolak resin imparts to the phenolic resin coating composition sufficient water solubility-reducing character. The desirable spectrophotometric absorbance of the water soluble components leached from the phenolic resin coated sand composition of the present invention is below about 1.68, at 510 mu and is preferably about 0.60 to about 1.0.

Hexamethylenetetramine is not needed and in fact, is not desirable in the cure of the resin coating compositions of the present invention because the resole resin will initiate the crosslink and cure of itself and the novolak resin at the elevated temperatures of down-hole applications. This is particularly advantageous because in conventional phenolic resin-coated proppants the hexamethylenetetramine can leach out into the water and adversely impact the proppant consolidation, due to interactions with the breakers, and this problem is avoided in the present invention. It is particularly desirable, therefore, in the present invention that the resole resin be arylphenol, alkoxyphenol, aryloxyphenol or alkylphenol-modified so that the level of resole resin is not reduced due to water solubility. There must be sufficient resole resin remaining in the phenolic coating composition to effect crosslink and cure of the novolak resin.

The physical and chemical properties, including water solubility, of the phenolic resin-coated proppants produced according to this invention can be adjusted by (1) varying the ratio of novolak resin to resole resin, (2) varying the amount of modification of the novolak resin, (3) varying the amount of modification of the resole resin, (4) varying the aryl, alkyl or other substituent or substituents on the phenol used in the resole or novolak resin, (5) varying the carbon atom chain length of the substituent or substituents on the modified phenol used in the resole or novolak resin, (6) varying the cook or reaction time, or temperature or pH for the preparation of the novolak resin, resole resin or combination thereof, and (7) varying the mixing time of the resin on and the temperature of the hot sand.

A process for preparing an improved phenolic resin coated proppant will be described below.

Particulate substrate, such as Badger Mining T-2380A sand, is heated to a temperature above about 250° F. and preferably to about 360° F. Novolak resin or alkylphenol-modified novolak resin, or a mixture thereof, is added to the hot sand and mixed for about 30 seconds. Preferably a silane coupling agent such as A-1100 available from Union Carbide Corporation, Tarrytown, N.Y. is added in a amount sufficient to provide desired bond strength. After mixing an additional 60 seconds, to the mixture is added a resole resin, or an alkylphenol-modified resole resin, or a mixture thereof. The mixture is stirred until it has advanced above a desired melt point. A preferred melting point is above about 125° F. minimum. The degree of resin advancing or increasing in molecular weight during the mixing or coating is important in the invention to achieve the desired melt point and resin composition properties. Water is then added in an amount sufficient to quench the reaction. Immediately after the addition of the water, it is desirable, but not required, to add to the mixture a small amount of a silicone fluid, such as L-45 available from Union Carbide Corporation followed by mixing for an additional 60 seconds. The silicone fluid is added in an amount sufficient to provide lubricity and minimize dust. The resulting phenolic resin-coated sand is screened and cooled. According to the present invention, the sequence of addition of the resole and novolak resins can be reversed, or can be simultaneous.

The interaction of phenolic resin coated proppants, prepared by the present invention, with crosslinked hydraulic fluid was examined by using a static break test. The time required to break an experimental slurry is a measure of the degree of interaction of the phenolic resin coated proppant with the breaker. Thus reduction in the time required to break the slurry indicates desirable reduced interaction.

To perform the static break test the following materials are combined in a blender; 2.4 grams of hydroxypropyl guar, 0.60 grams of sodium hydrogen carbonate, 0.15 grams fumaric acid, and 500 milliliters of 2.0% by weight aqueous potassium chloride solution. This mixture is blended for 30 minutes to form a hydrated base gel, to which is then added ammonium peroxydisulfate as the breaker. (Table I represents use of 0.35 grams of ammonium peroxydisulfate and Table II represents use of 0.20 grams.) This mixture is stirred until the breaker dissolves. To this mixture is added 404 grams of the phenolic resin coated proppant prepared by the present invention as described above. Then, 0.5 milliliters of the crosslinker, DuPont Tyzor 131, is added to the mixture and mixed for 30 seconds to form a crosslinked fluid slurry. The slurry is decanted into a 300 milliliter beaker which is placed in a 176° F. water bath for observation. Breaking of the slurry is indicated by settling of the proppant. As discussed above, the time required to break the slurry is a measure of the degree of interaction of coated proppant with the breaker.

Table I illustrates examples of breaker time test results measured in hours for conventional resin coated proppants (samples 1-2) and modified phenol resin coated proppants of the present invention (samples 3-8).

TABLE I

| PROPPANT SYSTEM (NOVOLAK/RESOLE | BREAKER TIME (HR.) |
| --- | --- |
| Control (uncoated sand) | 0.5 |
| 1. EX5150$^{(a)}$/HEXA$^{(b)}$ | >12 |
| 2. EX5150/HEXA$^{(c)}$ | 5.5-6 |
| 3. OX-31$^{(d)}$/HMR resole$^{(e)}$ | 2-3 |
| 4. NP-EX5150$^{(f)}$/HMR resole | 2.5-3.0 |
| 5. EX5150/HMR resole | 2-2.5 |
| 6. NP-EX5150/NP-HMR resole$^{(g)}$ | 1 |
| 7. EX5150/NP-HMR resole | 1 |
| 8. OX31/NP-HMR resole | 1 |

In these tests, 0.35 grams ammonium peroxydisulfate was used as the breaker.

(a) EX5150 is a non-alkylated Acme/Borden novolak flake resin with a formaldehyde to phenol mole ratio of 0.75:1.

(b) HEXA is hexamethylenetetramine. Sample 1 is a nonalkylated commercial product available from Acme/Borden Resin Corporation as AcFrac CR.

(c) Sample 2 is a non-alkylated commercial product available from Acme/Borden Resin Corporation as AcFrac SB.

d) OX-31 is a non-alkylated novolak resin manufactured by Borden, Inc., Louisville, Ky. with a low free phenol content of 2 to 3.5 weight percent.

(e) HMR resole is a non-alkylated high molar ratio resole resin prepared by the method of Example 2 with a ratio of formaldehyde to phenol of 2.75:1.

(f) NP-EX5150 is an EX5150-type novolak resin which has been modified with 25 molar % nonylphenol.

(g) NP-HMR resole is a high molar ratio (2.75:1) resole resin which has been modified with 25 molar % nonylphenol.

As can be seen from Table I, gels of uncoated sand will break in about one-half hour, while the conventional hexa-cured novolak resins of samples 1 and 2 exhibit relatively long breaker times indicative of significant interaction between the resin and the breaker. This is thought to be due to migration of either hexamethylenetetramine, or unreacted phenol, and other low molecular weight phenolic compounds or both, into the water. Inventive samples 3 and 4 show reduced breaker time for novolak/resole blends which are not alkylphenol-modified. Sample 5 shows a phenolic resin composition comprising a nonylphenol-modified novolak resin and a non-modified resole resin. Sample 6 represents a phenolic resin composition of the present invention in which both the novolak resin (EX5150) and the high molar ratio resol resin have been modified by the incorporation into each of 25 molar percent of nonylphenol. Samples 7 and 8 show phenolic resin compositions of the present invention in which the nonylphenol-modified high molar ratio resole resin is combined with different non-modified novolak resins. Sample 8 shows a phenolic resin composition comprising a nonylphenol-modified novolak resin and a non-modified resole resin. It is clear from Table I that inventive samples 3-8 show a marked reduction in breaker time, a feature desired in reducing interaction between the breaker fluid and proppant.

TABLE II

Effect of Alkyl substituents in resoles:

| Modifier of high molar ratio resole, (by mole) | Breaker Time (hrs.) |
| --- | --- |
| none | 6.0 |
| p-cresol, 22.5% | 5.25 |
| p-t-butylphenol, 17.3% | 5.0 |
| p-nonylphenol, 12.5% | 3-3.25 |
| p-nonylphenol, 25% | 3-3.25 |
| p-nonylphenol, 100% | 2.0 |
| p-dodecylphenol, 10.7% | 3.0 |
| cashew nut shell liquid*, 9.5% | 3.25-3.5 |

*Cashew nut shell liquid is essentially a meta $C_{15}$ alkylphenol. The resole made with this alkylphenol is inhomogeneous. The proppants in Table II were prepared using EX5150 novolak and the above resoles. Relative to Table I, there is a change in peroxydisulfate content to a lower level which slows break time.

In these static breaker tests, 0.2 gm ammonium peroxydisulfate was used. Also, Table II represents a change in crosslinker DuPont Tyzor 131 shipment which affects break time.

WATER TOLERANCE OF RESOLES

Resin compatibility with water was measured using the water tolerance test. The resin and water were equilibrated to 25±1° C. 50 gm of the resin was placed in a 250 mL Erylenmeyer flask. With constant agitation, water was then slowly added to the resin until a white cloudiness persisted in the resin solution. The weight of water added was recorded. % water tolerance was calculated using the following equation.

% Water Tolerance=(wgt. of water added to cause cloudiness)×2

TABLE III

| Modifier of Alkylphenol Resoles, mole % | Water Tolerance |
| --- | --- |
| unmodified | 380 |
| p-methylphenol, 22.5% | 330 |

TABLE III-continued

| Modifier of Alkylphenol Resoles, mole % | Water Tolerance |
| --- | --- |
| t-butylphenol, 17.3% | 98 |
| p-nonylphenol, 12.5% | 40 |
| p-nonylphenol, 25.0% | 20 |
| p-nonylphenol, 100% | 10 |
| p-dodecylphenol, 10.7% | 32 |
| Cashew nut shell liquid*, 9.5% | 80 |

*The resole is not completely homogeneous. Particulates are observed in the resin.

With the exception of cashew nut shell liquid modified resole, water tolerance decreases with chain length of alkyl modifications at the same weight level. Furthermore, increasing alkylphenol modification level also decreases water tolerance of resoles. p-Nonylphenol modified resoles illustrate this trend.

LEACHABILITY OF COATED PROPPANTS

Water soluble components of resin on the newly developed proppants are free phenol, alkylphenol and their low molecular weight derivatives. These water soluble components interfere with action of the breaker. The level of these materials is indicative of the extent of breaker interference. Coated proppants are extracted with water and the quantity of water soluble components is evaluated by spectrophotometric analysis of phenolic functionalities in the aqueous phase.

SPECTROPHOTOMETRIC MEASUREMENT PROCEDURE 10 gm resin coated proppant was suspended in 100 mL de-ionized water. The mixture was stirred at ambient temperature for 30 minutes. The aqueous phase was collected. 10 mL of the water extract, along with 75 mL de-ionized water, was added to 15 mL 0.1N sodium hydroxide. To this solution, 2 mL 0.93 N ammonium chloride, 2 mL 0.24N aminoantipyrine and 2 mL 0.1N potassium ferricyanide were added. A yellow to reddish purple color developed, depending on amount of phenolic functionalities. Absorbance of the solutions at 510 nm was measured using a Bausch and Lomb Spectronic 20 spectrophotometer.

TABLE IV

| | Absorbance at 510 mu |
| --- | --- |
| Modifier of Alkylphenol, mole % | |
| unmodified | 0.62 |
| p-methylphenol, 22.5% | 0.31 |
| p-t-butylphenol, 17.3% | 0.42 |
| p-nonylphenol, 12.5% | 0.15 |
| p-nonylphenol, 25.0% | 0.11 |
| p-nonylphenol, 100% | 0.05 |
| p-dodecylphenol, 10.7% | 0.23 |
| Cashew nut shell liquid*, 9.5% | 0.27 |
| Controls | |
| AcFrac CR (cured with hexa) | 1.75 |
| AcFrac SB (cured with hexa) | 0.27 |
| AcFrac PR (a fully cured coated sand) | 0.02 |
| Raw sand | 0 |

*inhomogeneous resole

The results indicate that the leachate from unmodified high molar ratio resole proppant contains more phenolic materials than those from other modified resoles. It is likely that the amount of leachable materials is strongly influenced by the extent of cure during the coating process.

For the series of resin coated proppants with nonylphenol, the leachable materials decreased with increasing level of nonylphenol modification.

To further demonstrate this system, several proppants using EX5150 novolak and unmodified high molar ratio resole with different degree of advancement or mixing time were prepared. Their spectrophotometric absorbance at 510 mu and breaker interaction are shown in Table V.

TABLE V

| EX5150/High Molar Ratio Resole Proppants | Mixing Time (Min.) | Absorbance at 510 mu | Break Time (hrs) |
| --- | --- | --- | --- |
| 1 | 3 | 2.00 | —* |
| 2 | 3.75 | 1.68 | 7 |
| 3 | 4 | 1.13 | 7.5 |
| 4 | 4.5 | 0.62 | 6 |
| AcFrac SB (control) (hexa cured) | | 0.27 | 12 |

*No crosslinked fluid was formed when the crosslinker was added.

This series of results suggest that the proppant should have a spectrophotometric absorbance for leachable water soluble materials at 510 mu of about 1.68 or less. It can be seen from Table V that absorbance of 2.00 was associated with an unacceptable result (no break time due to failure to crosslink). The reaction of the crosslinker is inhibited by the presence of water soluble components leached from the coating material. Also, the longer the mixing time, the more advanced the coating became, and consequently, less soluble material is obtained from the more advanced proppants.

GENERAL LABORATORY PREPARATION OF RESOLES

Phenol and alkylphenol were charged into a 3-necked, 5-liter round bottom flask equipped with an overhead stirrer, a thermometer and a condenser. A 50% formaldehyde aqueous solution (2.75 moles per mole of phenol OH functionalities) was added to the mixture. The temperature of the mixture was adjusted to 60° C. and lime (0.33 gm per mole of phenol OH functionalities) was added to the reaction mixture. The mixture was reacted at 80° C. After 30 minutes, it was cooled to 70° C. and a second quantity of lime (0.67 gm per mole of OH functionalities) was added to the reaction. Then the mixture was further reacted at 80° C. for 2 and a half hours. Subsequently, the reaction mixture was dehydrated to give a final resin of approximately 85±5% solids.

MODIFIED MELT POINT DETERMINATION

Modified melt point of resin-coated proppant is determined using a melt point bar. The melt point bar is electrically heated to give a temperature gradient across the bar. Temperatures of various points on the bar are measured using a series of thermometers inserted into the body of the bar. Using a funnel, a uniform strip of resin-coated proppant is laid on the heated bar. The proppant is allowed to set for 60 seconds. The bar is then turned on its side and loose proppant particles are allowed to roll off the bar. The temperature where the proppant still sticks to the bar is noted a the modified melt point.

COMPRESSIVE STRENGTH

Compressive strengths of resin-coated proppants were determined at atmospheric pressure and under 1,000 psi stress. 2 weight percent KCl solution (doped with a small amount of detergent to enhance wetability) was added to proppant. The mixture was gently agitated to wet the proppant. The wet proppant was then packed into a 50 mL (103 mm×29 mm) plastic centrifuge tube with frequent tapping and pushing. Three such specimens were prepared and placed into a tin can. The can was sealed and placed in a 200° F. for 24 hours. During the curing process loose proppant particles become a consolidated mass. After 24 hours, the specimens were removed. Both ends of the slug were smoothed to give flat surfaces and the slugs were 2 inches in length. Compressive strengths of the slugs were determined using a Detroit Testing machine and the average was reported.

For determining compressive strength under 1,000 psi stress, resin-coated proppant was wet with 2% KCl solution and packed into a heating tape-wrapped steel tube. After packing proppant, a load of 1,000 psi was applied using a press. The specimen was then heated to 200° for 24 hours. After curing, the specimen was removed and compressive strength was determined.

TABLE VI

| | Compressive Strength (psi) | |
|---|---|---|
| | atmospheric | under 1000 psi |
| Modifier of high molar ratio resole, level (mole %) | | |
| unmodified | <20 | 275 |
| p-methylphenol, 22.5% | <30 | 300 |
| p-t-butylphenol, 17.3% | <50 | 240 |
| p-nonylphenol, 12.5% | <30 | 350 |
| p-nonylphenol, 25.0% | <30 | 360 |
| p-nonyphenol, 100% | <10 | 100 |
| p-dodecylphenol, 10.7% | <30 | 360 |
| cashew nut shell liquid*, 9.5% | <50 | 200 |
| Controls | | |
| AcFrac CR 5000 (hexa cured) | 525 | 575 |
| AcFrac SB (hexa cured) | 175 | 275 |
| AcFrac PR (a fully cured coating) | 0 | 0 |

*inhomogeneous resin

Resole resins were prepared as described above using as modifiers p-methoxyphenol and p-phenoxyphenol. The mole % modifications were 20.6 mole % for p-methoxyphenol and 14.4 mole % for p-phenoxyphenol. The molar ratio of formaldehyde to phenol/methoxyphenoxyphenol was 2.75:1. Table VII shows the resulting water tolerance, compressive strengths, breaker times, and UV absorbance. The proppants thus produced by mixing EX5150 novolak and these resoles follow the trend wherein the removal of hexamethylenetetramine lowers the breaker requirement substantially.

TABLE VII

| Alkoxy and Phenoxy Modified Resoles | | |
|---|---|---|
| | p-Methoxyphenol | p-Phenoxyphenol |
| Water Tolerance | 330 | 102 |
| Compressive Strength | | |
| atmospheric | 60 | <50 |
| 1000 psi | 300 | 275 |
| Breaker Time (hrs.) | | |
| 0.20 gm ammonium peroxydisulfate | 7.5 | 4 |
| 0.35 gm ammonium peroxydisulfate | 5.25 | 1.5 |
| UV Absorbance | 0.60 | 0.32 |

It is desirable that a proppant has low compressive strength at atmospheric pressure and possesses high compressive strength under load. If a proppant is not correctly placed in well fractures and experiences no stress during cure, the improperly placed proppant of the present invention can be removed easily. Conversely, for a proppant to perform effectively, the proppant placed in well fractures should consolidate under pressure and be strong enough to withhold pressure to keep fractures opened. Therefore, a high compressive strength under stress is desired. The new proppants will provide such an advantage over the currently available products.

The free-flowing, heat curable resin-coated particles as produced by the above method may be used in sand control, or as proppants, or fluid loss agents in hydraulic fracturing. In carrying out a hydraulic fracturing operation, a fracture is first generated by injecting a viscous fluid into the formation at a sufficient rate and pressure to cause the formation to crack or fracture. A carrier fluid having the proppant suspended therein is then pumped into the developing fracture until the desired fracture size has been achieved. The temperature of the carrier fluid during pumping operations may be low so as to prevent premature curing of the resin coat. The carrier fluid can return back out of the well hole o bleed off into the formation depositing the propping agent in the fracture. This process is controlled by fluid loss agents which are small aggregate particles which temporarily slow the fluid loss to the formation. It is a particular advantage of the present invention that the fluid loss is not further compounded by the migration of water soluble resin, or hexamethylenetetramine.

After the proppant is placed, the well is optionally shut in with pressure maintained on the formation. As the pressure within the fracture approaches the normal formation pressure, the fracture walls close in on the proppant and apply an overburden stress thereto. The strength imparted by the coating helps maintain the integrity of the proppant. At the same time ambient subterranean temperature heats the resin coating and the breakers reduce the viscosity of the fluid, whereby the sand particles can come into contact with each other. Initially, the phenolic resin crosslinks and fuses forming a three dimensional permeable matrix which is porous to the oil or gas. As the temperature increases the polymerization reaction proceeds until the resin is cured into an insoluble and infusible cross-linked state. The pendular regions between adjacent particles bond the packed particles into a permeable mass having considerable compressive strength. By the present invention, improved and predictable control of the interaction between the breaker and the fluid is achieved relative to the use of hexamethylenetetramine-containing coated proppants.

Another feature of the present invention is the relative low strength obtained in the cured composition if cured without compression, but high compressive strengths if cured under pressure. This is important and valuable if the resin coating should accidentally be cured in the pipe or well hole before it reaches the subterranean formation where high pressures and temperatures are encountered. Prematurely cured compositions produced by the present invention can be flushed out of the pipe with water whereas conventional hexamethylenetetramine-cured novolaks cannot be flushed with water from the pipe or well hole.

Further modification and alternate embodiments of the invention will be apparent to those skilled in the art in view of this description. Accordingly, this description is to be considered as illustrative only and for the purpose of teaching those skilled in the art the manner of carrying out the invention. Various modifications may be made in the method. Applicants intend that all such modifications, alterations and variations which fall within the spirit and scope of the appended claims be embraced thereby.

That which is claimed is:

1. A curable phenolic resin composition useful as a subterranean proppant coating comprising:
   (a) a novolak resin; and
   (b) a resole resin, wherein at least one of the resins is modified by the incorporation of a phenolic material selected from the group consisting of arylphenol, alkylphenol, alkoxyphenol, and aryloxyphenol and wherein the weight ratio of novolak resin to resole resin is from about 4:1 to about 1:9, and wherein the content of the modifying phenolic material is sufficient to reduce the water solubility of the coating relative to a comparable mixture of novolak and resole resins which is not modified and wherein the composition does not contain sufficient hexamethylenetetramine to effect the cure of the composition.

2. The composition of claim 1 wherein the novolak resin is present in the composition in an amount greater than about 10 weight percent.

3. The composition of claim 1 wherein the resole resin is present in the composition in an amount greater than about 20 weight percent.

4. The composition of claim 1 wherein the phenolic material is alkylphenol and the alkyl group of the alkylphenol is selected from the group consisting of methyl, ethyl, n-propyl, isopropyl, n-butyl, t-butyl, isobutyl, n-pentyl, isopentyl, isoamyl, amyl, n-hexyl, isohexyl, branched hexyl, heptyl, octyl, nonyl, decyl, undecyl, dodecyl and cashew nut shell liquid.

5. The composition of claim 1 wherein the phenolic material is alkylphenol and the alkylphenol-modification of the resole resin is monoalkylation.

6. The composition of claim 1 wherein the alkylphenol-modification of the resole resin is dialkylation, wherein the alkyl groups are independently selected.

7. The composition of claim 1 wherein the alkylphenol-modification of the resole resin is trialkylation, wherein the alkyl groups are independently selected and sufficient ortho and para positions are available to achieve crosslinking.

8. The composition of claim 1 wherein the phenolic material is arylphenol and the arylphenol-modified resole resin comprises phenylphenol.

9. A method of preparing a phenolic resin-coated sand comprising:
   (a) combining alkylphenol and phenol in a molar ratio of 0.05:1 to 0.60:1;
   (b) reacting phenol or the combination from (a) with a source of formaldehyde in a phenol:formaldehyde ratio of from about 1:1 to about 4:1 under basic conditions sufficient to produce a resole or an alkylphenol-modified resole resin;
   (c) combining the resin from step (b) with sand heated to a temperature above 250° F. for a time sufficient to allow the resin to increase in molecular weight;
   (d) adding a novolac resin to the mixture in (c), wherein the weight ratio of novolak resin to resole resin is from about 4:1 to about 1:9 on a solids basis, whereby the sand becomes coated;
   (e) adding sufficient water to quench the reaction;
   (f) cooling the resulting phenolic resin-coated sand.

10. The method of claim 9 wherein the resole resin is made from phenol or is alkylphenol-modified, arylphenol-modified, alkoxyphenol-modified or aryloxyphenol-modified.

11. The method of claim 9 wherein the alkyl group of the alkylphenol in the novolak resin is selected from the group consisting of methyl, ethyl, n-propyl, isopropyl, n-butyl, t-butyl, isobutyl, n-pentyl, isopentyl, isoamyl, amyl, n-hexyl, isohexyl, heptyl, octyl, nonyl, decyl, undecyl, dodecyl and cashew nut shell liquid.

12. The method of claim 10 wherein the alkyl group of the alkylphenol in the resole resin is selected from the group consisting of methyl, ethyl, n-propyl, isopropyl, n-butyl, t-butyl, isobutyl, n-pentyl, isopentyl, isoamyl, amyl, n-hexyl, isohexyl, heptyl, octyl, nonyl, decyl, undecyl, dodecyl and cashew nut shell liquid.

13. A method of preparing phenolic resin-coated sand comprising:
   (a) adding a novolak resin to sand heated to a temperature above 250° F.;
   (b) adding to the stirring mixture from (a) phenol or an alkylphenol-modified, alkoxyphenol-modified, aryloxyphenol-modified, or arylphenol-modified resole resin prepared by reacting a mixture comprising an alkylphenol, alkoxyphenol, aryloxyphenol or arylphenol with a molar excess of formaldehyde under alkaline conditions sufficient to produce a resole resin, whereby the sand is coated;
   (c) adding sufficient water to quench the reaction; and
   (d) cooling the resulting phenolic resin-coated sand.

14. The method of claim 13, wherein the alkyl group of the alkylphenol is selected from the group consisting of methyl, ethyl, n-propyl, isopropyl, n-butyl, t-butyl, isobutyl, n-pentyl, isopentyl, isoamyl, amyl, n-hexyl, isohexyl, heptyl, octyl, nonyl, decyl, undecyl, dodecyl, and cashew nut shell liquid.

15. The method of claim 13 wherein the source of the alkyl group of the alkylphenol is cashew nut shell liquid.

16. The method of claim 13 wherein the aryl group of the arylphenol is phenyl.

17. An improved method for treating subterranean formations comprising:
   (a) applying to a subterranean formation a proppant coated with a curable phenolic coating composition, wherein the phenolic coating composition comprises a mixture of a novolak resin and a resole resin, wherein the spectrophotometric absorbance at 510 mu of the water soluble leachate from the phenolic coated sand composition is below about 1.68, and wherein the phenolic coating composition does not comprise hexamethylenetetramine in an amount sufficient to significantly affect subsequent cure of the coating composition; and
   (b) curing the curable phenolic coating composition by exposing the coating composition to sufficient heat and pressure in the subterranean formation to cause crosslinking of the resins, and consolidation of the proppant, whereby a cured proppant coating with reduced water solubility is attained.

18. The method of claim 17 wherein the novolak and resole resins are combined in a 4:1 to 1:9 weight ratio on a solids basis.

19. The method of claim 17 wherein the novolak resin has been modified by the incorporation of a alkylphenol selected from the group consisting of methyl, ethyl, n-propyl, isopropyl, n-butyl, t-butyl, isobutyl, n-pentyl, isopentyl, isoamyl, amyl, n-hexyl, isohexyl, heptyl, octyl, nonyl, decyl, undecyl, dodecyl, and cashew nut shell liquid.

20. The method of claim 17 wherein the novolak resin has been modified by the incorporation of a arylphenol.

21. The method of claim 17 wherein the resole resin has been modified by the incorporation of an alkylphenol selected from the group consisting of methyl, ethyl, n-propyl, isopropyl, n-butyl, t-butyl, isobutyl, n-pentyl, isopentyl, isoamyl, amyl, n-hexyl, isohexyl, heptyl, octyl, nonyl, decyl, undecyl, dodecyl, and cashew nut shell liquid.

22. The method of claim 17 wherein the resole resin has been modified by the incorporation of an arylphenol.

23. The method of claim 17 wherein the resole resin has been modified by incorporation of an alkoxyphenol or an aryloxyphenol.

24. The method of claim 17 wherein the novolak resin has been modified by incorporation of an alkoxyphenol or an aryloxyphenol.

25. A curable phenolic resin composition useful as a subterranean proppant coating comprising:
  (a) a novolak resin; and
  (b) a resole resin, and wherein the weight ratio of novolak resin to resole resin is from about 4:1 to about 1:9, and wherein the molecular weight of the resin composition is sufficiently advanced to reduce the water solubility of the coating relative to a comparable mixture of novolak and resole resins which is not similarly advanced, and wherein the composition does not contain sufficient hexamethylenetetramine to effect the cure of the composition.

* * * * *